United States Patent Office 3,433,469
Patented Mar. 18, 1969

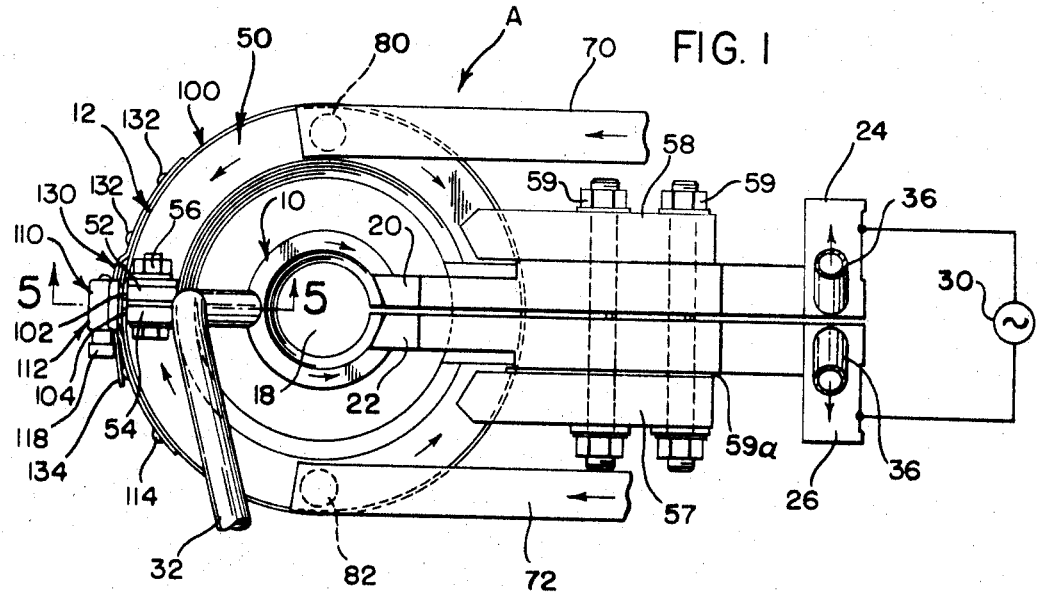
FIG. 1
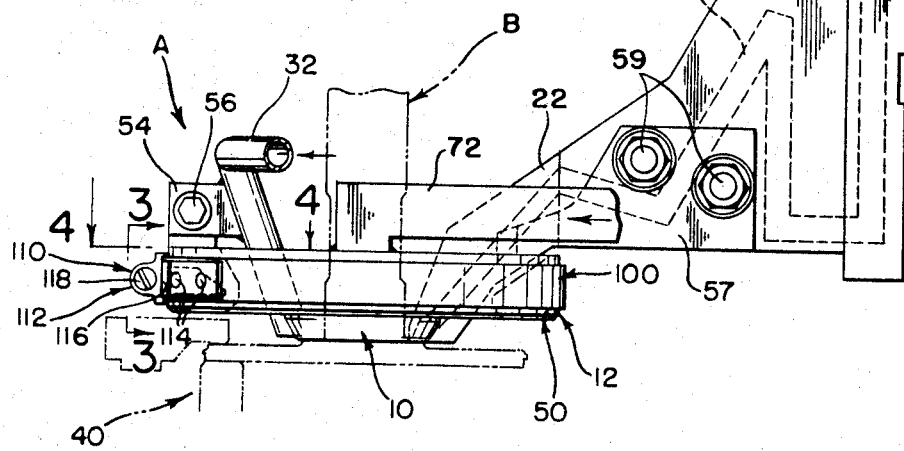
FIG. 2
FIG. 3
INVENTORS.
JOHN R. LAUGHLIN &
DAVID R. SOWOROWSKI
BY *Tillery & Body*
ATTORNEYS

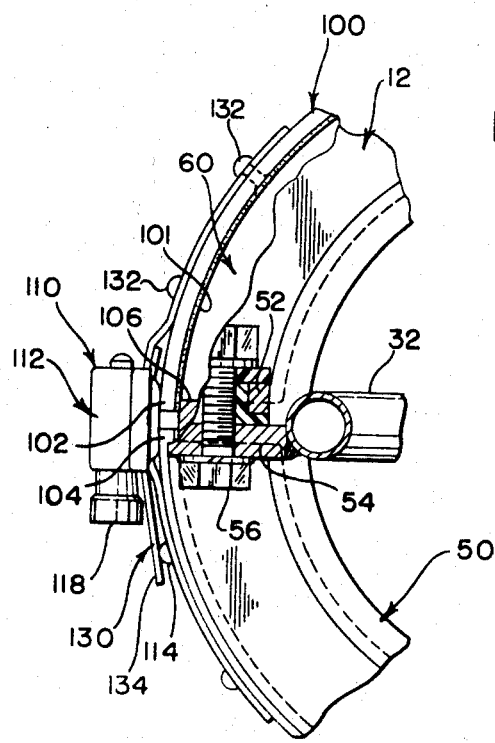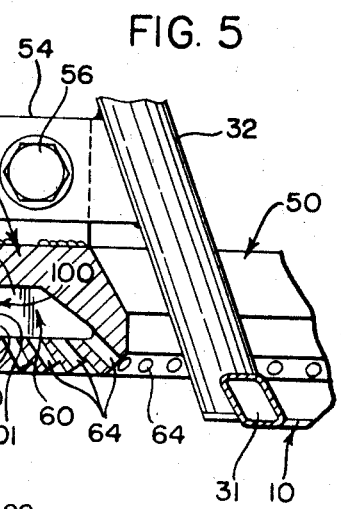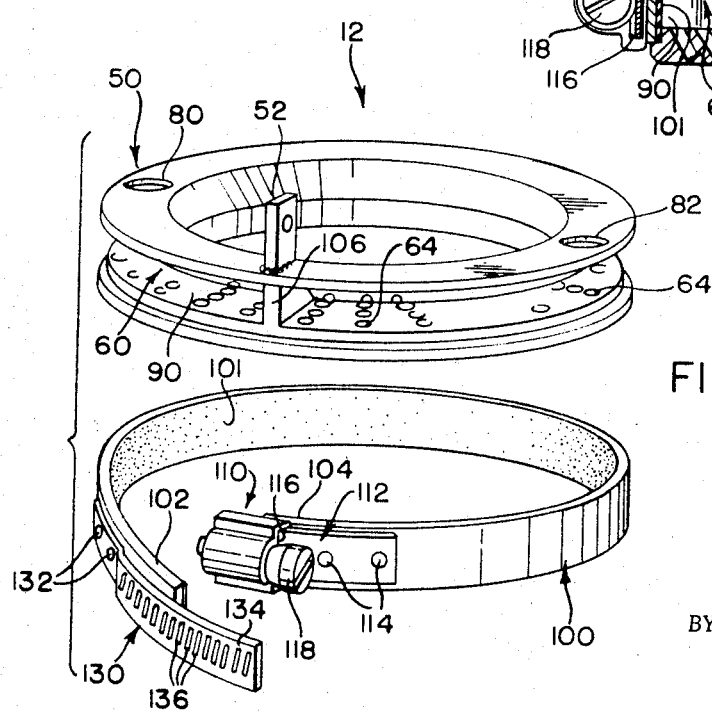

3,433,469
QUENCHING DEVICE FOR AN INDUCTION
HEATING APPARATUS
John R. Laughlin, Brecksville, and David R. Soworowski,
Parma, Ohio, assignors to Park-Ohio Industries, Inc., a
corporation of Ohio
Filed Sept. 15, 1964, Ser. No. 396,639
U.S. Cl. 266—4
Int. Cl. C21d 1/66; B05b 15/02, 1/18
3 Claims

ABSTRACT OF THE DISCLOSURE

An induction heating device including an inductor and an annular quenching device wherein the quenching device has an outwardly facing clean-out opening covered by a flexible band which may be removed to clean the interior of the quenching device.

---

The present invention pertains to the art of induction heating and more particularly to an improved quenching device for an induction heating apparatus.

The present invention is particularly adapted for use with an induction heating apparatus for progressively hardening the surface of an elongated workpiece, such as an axle shaft, and it will be described with particular reference thereto; however, it is to be appreciated that the invention has much broader applications and may be used in other induction heating apparatus.

In the manufacture of axle shafts, propeller shafts and similar driving shafts, it is common practice to first cast or forge the shaft into a general shape and then to machine various surfaces of the shaft into a somewhat final shape. Thereafter, the outer elongated surface of the shaft is hardened so that the shaft will have a tough inner core and a hardened outer case along the length thereof. The common procedure for performing this hardening operation is to provide an inductor surrounding the shaft and energized by a high frequency electrical source. The energized inductor is moved progressively along the length of the shaft with the result that the outer surface of the shaft is progressively heated to a temperature above its hardening temperature. Immediately behind the energized inductor there is provided a quenching device which surrounds the workpiece and has outlet orifices directed toward the elongated surface of the shaft. After a particular area of the shaft is heated, the quenching device directs a quenching fluid, such as water or oil, against the heated surface so that the surface is immediately quench hardened.

In accordance with normal practice, the quenching device generally includes a body with an internal quench passageway connected to a supply of quenching fluid and provided with a plurality of the outlet orifices mentioned above. These orifices extend from the quench passageway toward the shaft so that the quenching fluid can be directed onto the elongated surface of the shaft.

Generally, axle shafts and similar items are relatively high production articles; therefore, the induction heating apparatus for hardening the elongated surface of such shafts is used repeatedly for an extended period. It has been found that the quenching fluid often contains certain impurities, such as metal shavings and dust particles. This is especially true when the quenching fluid is recycled through the apparatus and used repeatedly to quench numerous shafts. These impurities tend to accumulate in the internal passageway and in the small outlet orifices extending from the passageway. Consequently, after a given time, some of the outlet orifices become clogged and the passageway within the quench body becomes laden with such impurities.

In order to obtain uniform hardening of the shaft surface, it is necessary that a uniform stream of quenching fluid be directed toward the surface of the shaft. Sometimes, when certain outlet orifices become clogged with impurities carried by the quenching fluid, the quenching action of the quenching fluid becomes less uniform and the resulting hardened surface of the shaft may be somewhat defective. In addition, when a number of these quench orifices become clogged, the flow of quenching fluid may be drastically reduced so that the amount of quenching fluid directed against the heated shaft may not be sufficient to quench the shaft surface to the desired extent. In these cases, it is necessary to either replace the quenching device or remove the quenching device from the heating apparatus and disassemble the same for cleaning purposes. Either of these procedures is time consuming and results in a substantial amount of down time for the heating apparatus.

To overcome these disadvantages, it has been proposed to place filters in the quenching fluid conduit ahead of the quenching device so that the filter would remove the impurities from the quenching fluid before they pass into the quench body. Since the filter cannot remove all impurities from the quenching fluid, the filter only prolongs the time between cleaning or replacement of the quenching device. In addition, if the filter is not cleaned frequently, the filter often by-passes unfiltered quenching fluid so that the same problems are presented as were presented without the filter. Consequently, the use of the filter has not completely solved the problems caused by the impurities within the quenching fluid.

The disadvantages mentioned above and others are completely overcome by the present invention which is directed toward an improvement in a quenching device whereby the clogging of the quenching outlet orifices does not cause a substantial amount of machine down time during operation of an induction heating apparatus using the device.

In accordance with the present invention there is provided a quenching device for an induction heating apparatus, said quenching device comprising an annular quench body having a radially, outwardly facing periphery, an inner workpiece receiving opening, an internal quenching fluid passageway, outlet orifices extending from said passageway facing radially and generally toward said workpiece opening, a clean-out opening in said pheriphery and extending to said quenching fluid passageway, a clean-out cover and means for releasably holding said cover over said clean-out opening.

By constructing the quenching device as defined above, the cover on the clean-out opening may be removed when clogging is noted and a brush or other implement can be extended into the quenching fluid passageway for cleaning the passageway or the outlet orifices extending therefrom. In this manner, only a relatively short time is required for rehabilitating the quenching device. The quenching device need not be replaced as was required when the quenching device was not provided with a structure as contemplated by the present invention.

The primary object of the present invention is the provision of a quenching device for an induction heating apparatus of the type used to progressively harden an elongated workpiece, which device need not be periodically removed from the apparatus because of clogging due to impurities suspended within the quenching fluid flowing through the quenching device.

Another object of the present invention is the provision of a quenching device for an induction heating apparatus of the type used to progressively harden an elongated workpiece, which device may be easily cleaned without being removed from the apparatus.

Another object of the present invention is the provision of a quenching device for an induction heating apparatus of the type used to progressively harden an elongated workpiece, which device includes a clean-out opening extending into the internal quenching fluid passageway of said quenching device and a removable cover for said opening whereby the cover may be removed to clean the passageway of the quenching device without removing the quenching device from the apparatus.

These and other objects and advantages will become apparent from the following description used to illustrate the preferred embodiment of the invention as read in connection with the accompanying drawings in which:

FIGURE 1 is a top plan view illustrating the preferred embodiment of the present invention;

FIGURE 2 is a side elevational view of the preferred embodiment shown in FIGURE 1 with the workpiece illustrated in phantom lines;

FIGURE 3 is an enlarged, partial view taken generally along line 3—3 of FIGURE 2;

FIGURE 4 is an enlarged, partial cross-sectional view taken generally along line 4—4 of FIGURE 2;

FIGURE 5 is an enlarged, partial cross-sectional view taken generally along line 5—5 of FIGURE 1; and FIGURE 6 is an exploded view showing the primary structural features of the preferred embodiment of the present invention.

Referring now to the drawings wherein the showings are for the purpose of illustrating a preferred embodiment of the invention only and not for the purpose of limiting same, FIGURES 1 and 2 show an apparatus A for progressively hardening the longitudinal surface of an elongated workpiece, such as automotive axle shaft B, shown in phantom lines in FIGURE 2. The apparatus A includes, as its primary elements, an inductor 10 and a quenching device 12. The inductor 10, as it passes upwardly along the shaft B, progressively heats the elongated surface of the shaft and the quenching device then quenches the heated portion of the shaft to harden the elongated surface thereof. The mechanism for scanning or progressively moving inductor 10 and quenching device 12, as a unit, along the surface of the shaft B is not disclosed because such mechanism does not form a portion of the invention and is well-known in the art of hardening elongated workpieces.

Referring now more particularly to the inductor 10, the inductor has a central workpiece receiving opening 18 through which the shaft B extends during the heating operation. The inductor is connected by leads 20, 22 onto support brackets 24, 26 which are, in turn, electrically connected onto an appropriate power source, schematically represented as generator 30. The generator creates a high frequency alternating current which is directed through the inductor 10. In this manner, the shaft B is inductively heated as the inductor scans axially along its length. In accordance with normal practices, the inductor 10 is provided with an internal coolant passageway 31 adapted to receive coolant, such as water, from inlet conduit 32. The water circulates around the inductor and exits through outlet passages 34 to the outlet conduits 36. The illustrated plumbing utilized for directing the coolant through the inductor passageway 31 is representative in nature and it is appreciated that various other arrangements could be used for cooling the inductor 10 during its operation.

Shaft B is supported by an appropriate structure 40, shown in phantom lines in FIGURE 2, which structure generally includes a clamping device and a means for rotating the shaft. Other means, not shown, causes axial movement of the shaft with respect to the inductor 10 so that the inductor 10, when energized by source 30, progressively heats the longitudinal or axially extending surface of the shaft.

Referring now to the quenching device 12, this device is positioned immediately adjacent the inductor 10 and, in essence, forms an integral unit with the inductor. A quenching fluid, such as water or oil, is directed through the device 12 and against the shaft B immediately after the shaft has been heated by the inductor 10. In this manner, the surface of the shaft B is hardened to provide a relatively soft inner core and a rigidified outer surface or case.

The quenching device 12 includes a generally annular body 50 (best shown in FIGURE 6) which body has an upwardly extending bracket 52 for supporting lug 54 which is connected directly onto inductor 10. A bolt assembly 56 rigidly connects the bracket 52 and lug 54, as is best shown in FIGURE 4. In this manner, the inductor 10 and quench device 12 are securely fastened to each other at a position opposite the brackets 24, 26. Adjacent the brackets 24, 26, the quenching device 12 is fixedly connected onto the leads 20, 22 by mounting plates 57, 58 which are secured onto the quench body 50. Bolts 59 extend through the mounting plates and leads to tie the quenching body onto the leads. A thin sheet 59a of insulation material is provided between plate 57 and lead 22 so that the quenching device is isolated from lead 22. In like manner, the bolts 59 and bolt assembly 56 are provided with insulation material so that the only electrical connection between the leads 20, 22 and the quenching device 12 is at plate 58. This prevents current flow through the quenching device 12 during operation of the inductor 10.

In accordance with the illustrated embodiment of the invention, the body 50 is provided with an arcuately shaped, internal passageway 60 extending generally around the complete length of the body 50. In the lower surface of passageway 60 there is provided a plurality of quenching or outlet orifices 64 which are directed radially inwardly and axially from the internal passageway 60 in a manner best shown in FIGURE 5. In order to direct a quenching fluid, such as water or oil, into the internal passageway 60 there is provided quench inlet conduits 70, 72 which are communicated with diametrically opposed inlet apertures 80, 82 in the upper wall of the quench body 50. The particular manner of introducing the quenching fluid into internal passageway 60 is representative in nature and it is appreciated that the upper wall of quench body 50 could be provided with one or more arcuately shaped circumferentially extending slots which would impose less resistance to the flow of quenching fluid than the apertures 80, 82, as shown in the illustrated embodiment of the invention. In any respect, the apparatus A is provided with appropriate structure to introduce the quenching fluid into the arcuately extending passageway 60.

In operation of the apparatus as so far described, the inductor 10 progressively heats the axially extending surface of shaft B and, immediately after the shaft surface is heated, quenching fluid is introduced under pressure into the passageway 60 where it is forced outwardly through orifices 64 into contact with the heated surface of the shaft. In this manner, the surface of the shaft is quench hardened.

The quenching fluid often includes suspended impurities, such as dust particles or metal shavings. This is especially true when the quenching fluid is recirculated and repeatedly used for quenching the surfaces of numerous shafts. It has been found that these impurities eventually accumulate in passageway 60 and clog the orifices 64. Consequently, there is an uneven flow of coolant fluid against the heated surface of the shaft. In the past, the quench body 50 had to be replaced when this clogging progressed to a sufficient extent that the hardening operation was inhibited. The present invention is directed toward an improvement in the device 12 as so far described wherein the accumulation of impurities within the passageway 60 and the outlet orifices 64 can be easily removed without separating the quenching device 12 from the apparatus A.

In accordance with the invention, the quench body 50 is provided with a peripherally extending clean-out opening 90 (See FIGURES 5 and 6) generally coextensive with the complete periphery of the body 50 and adjacent passageway 60. Around the clean-out opening there is provided a cover band 100, best shown in FIGURE 6, having an inner sealing surface 101 and spaced ends 102, 104. The band 100 is positioned around the body 50 so that the sealing surface 101 completely closes the opening 90. The split or space between ends 102, 104 is positioned at a partition 106 in passageway 60. Consequently, the spacing between the ends of band 100 will no tallow leakage of quenching fluid from the quench body 50 during normal operation of the device 12.

In accordance with the invention, a clamping device 110 is provided for clamping band 100 around body 50. This clamping device may take a variety of structural embodiments; however, in accordance with the preferred embodiment of the invention, the clamping device includes a female part 112 connected onto end 104 by a plurality of rivets 114. The female part 112 includes a slot 116 which is coextensive with a rotatably mounted bolt 118 having threads 122 adapted to extend generally into the slot 116. Cooperating with female part 112 is a male part 130 connected onto end 102 by a plurality of rivets 132 and having a tongue 134 adapted to be received within slot 116 of part 112. Extending transversely across the tongue 134 are a plurality of thread receiving grooves 136 adapted to match the threads 122 on bolt 118. By rotating the bolt, the tongue 134 is drawn through slot 116 so that the band 100 can be tightly clamped around the body 50 with the sealing surface 101 closing the opening 90 for normal operation of the quenching device 12.

When the outlet orifices 64 becomes clogged by an accumulation of impurities within passageway 60, the bolt 118 is rotated by an appropriate tool so that the band 100 may be removed from the quench body 50. Thereafter, a brush, or a similar implement, may be extended radially inward through the clean-out opening 90 so that the passageway 60 may be cleared and the orifices 64 may be unclogged. After this has been accomplished, the band 100 is again placed around the body 50 of the quench device 12 and clamped in position by device 110.

The present invention has been described in connection with certain structural embodiments; however, various changes may be made in these embodiments without departing from the intended spirit and scope of the present invention as defined by the appended claims.

Having thus described our invention, we claim:

1. In an induction heating apparatus for progressively hardening an elongated workpiece, said apparatus including an inductor encircling said workpiece, a high frequency source for energizing said inductor and a quenching device surrounding said workpiece for directing a quenching fluid against said workpiece immediately after said workpiece has been inductively heated by said inductor, said quenching device including an internal passageway and orifices extending from said passageway and pointing toward said workpiece, the improvement comprising: said passageway having a radially, outwardly facing clean-out opening, a cover for said opening and means for releasably holding said cover of said clean-out opening whereby said cover may be removed for cleaning said internal passageway and said orifices, said quenching device having a radially outwardly facing periphery, said clean-out opening extending from said passageway to said periphery and said cover means being a flexible band coterminous with said periphery, a sealing surface on said flexible band for sealing said clean-out opening and a releasable clamp on said band for releasably holding said band around said periphery with said sealing surface against said clean-out opening wherein said band has a first and second end and said clamp includes a first portion connected to said first end, a second portion connected to said second end and a clamping element including a male threaded part on one of said portions and a matching female threaded part on the other of said portions.

2. In an induction heating apparatus for progressively hardening an elongated workpiece, said apparatus including an inductor encircling said workpiece, a high frequency source for energizing said inductor and a quenching device surrounding said workpiece for directing a quenching fluid against said workpiece immediately after said workpiece has been inductively heated by said inductor, said quenching device including an internal passageway and orifices extending from said passageway toward said workpiece, the improvement comprising: said quenching device having a radially, outwardly facing periphery, a clean-out opening in said periphery and communicated with said internal passageway, and a flexible band extending as a complete loop around said periphery, said band having a sealing surface engaging and closing said opening, and releasable means for tightening said band around said periphery.

3. The improvement as defined in claim 2 wherein said band has two ends and said releasable means includes a first element secured to the first of said ends and a second element secured to the second of said ends, and said elements being mutually coacting to releasably tighten said band around said periphery.

References Cited

UNITED STATES PATENTS

| | | | |
|---|---|---|---|
| 2,019,281 | 10/1935 | Walcher | 266—6 X |
| 2,167,798 | 8/1934 | Denneen | 266—4 X |
| 2,386,122 | 10/1945 | Klingen | 239—567 X |
| 2,768,635 | 10/1956 | Redmond | 266—4 X |
| 2,293,047 | 8/1942 | Denneen et al. | 266—5 XR |

J. SPENCER OVERHOLSER, *Primary Examiner.*

R. S. ANNEAR, *Assistant Examiner.*

U.S. Cl. X.R.

219—10.49, 10.73; 239—106, 600, 567